United States Patent

Doorenbos

[15] 3,671,469
[45] June 20, 1972

[54] METHOD OF PREPARING HALOGEN-CONTAINING POLYMERS

[72] Inventor: Harold E. Doorenbos, Midland, Mich.
[73] Assignee: The Dow Chemical Company, Midland, Mich.
[22] Filed: Oct. 20, 1969
[21] Appl. No.: 867,921

[52] U.S. Cl. ..................260/2 H, 260/91.5, 260/91.7, 260/87.5 R
[51] Int. Cl. ..................C08f 3/20, C08f 13/00
[58] Field of Search ..................260/2 H, 91.5

[56] References Cited

UNITED STATES PATENTS

| | | | |
|---|---|---|---|
| 3,349,045 | 10/1967 | Gilch | 260/2 |
| 3,360,574 | 12/1967 | Ballester | 260/91.5 |
| 3,413,241 | 11/1968 | Le Suer et al. | 260/2 |

*Primary Examiner*—Murray Tillman
*Assistant Examiner*—Helen W. Roberts
*Attorney*—Griswold & Burdick and C. E. Rehberg

[57] ABSTRACT

Fluorine-, chlorine- and/or bromine-containing polymers are prepared by reacting
   a. a monomer or mixture of monomers having the structural formula $R-(CX_3)_n$, wherein $n$ is an integer from 2 to 4, X is fluoro, chloro or bromo, and R is an $n$-valent hydrocarbon or halo-substituted hydrocarbon group, each $-CX_3$ group being an allylic or benzylic trihalomethyl group; with
   b. CuX and/or $CuX_2$, wherein X has the above meaning, and
   c. phosphorous acid, alkyl hydrogen phosphonate and/or a dialkyl hydrogen phosphonate.

The polymers are thermally stable at elevated temperatures and are useful as heat-resistant, fire-resistant films, coatings, ablatives and the like.

9 Claims, No Drawings

METHOD OF PREPARING HALOGEN-CONTAINING POLYMERS

BACKGROUND OF THE INVENTION

The invention herein described was made in the course of or under a contract with the Department of the Air Force.

The synthesis, homopolymerization and product description of perchloro-p-xylene, perchloro-p,p'-bitolyl and perchloro-p-dipropenylbenzene were described by M. Ballester et al., J. Am. Chem. Soc., 88, 957 (1966). Ballester's polymerization reaction comprised reacting in solution the monomer at an elevated temperature, such as 100° C., under an inert atmosphere and in the presence of stannous or ferrous chloride.

The homopolymer of $\alpha,\alpha,\alpha,\alpha',\alpha',\alpha'$-hexachloro-p-xylene was described by V. W. Gash, J. Org. Chem., 32, 2007 (1967). The Gash polymerization reaction occurred by heating a homogeneous solution of the monomer and triethyl phosphite above 100° C.

H. G. Gilch, Polymer Sci., Part A-1, Vol. 4, 438 (1966), has prepared a polymer of $\alpha,\alpha,\alpha,\alpha',\alpha',\alpha'$-hexachloro-p-xylene by passing vapors of the monomer over metallic copper at 500° C. at reduced pressures to form $\alpha,\alpha,\alpha',\alpha'$-tetrachloro-p-xylene,

which was isolated and then polymerized by heating. CuCl was apparently formed in the preparation of $\alpha,\alpha,\alpha',\alpha'$-tetrachloro-p-xylene, but there is no indication that CuCl caused the homopolymerization of $\alpha,\alpha,\alpha,\alpha',\alpha',\alpha'$-hexachloro-p-xylene under his conditions. Gilch includes a method of preparing a film having excellent tensile strength from the polymer.

Each of the above homopolymers are heat-resistant, fire-resistant materials which (a) may be used as coating materials having heat ablative properties (such coatings typically being referred to merely as ablatives), (b) when soluble, may be cast into heat-resistant and fire-resistant films and other objects having many desirable physical properties, or they may be heat cured to insoluble products on fibrous support materials, such as fibers of glass, asbestos, boron, carbon or steel, and plied up into thermally stable fire-resistant laminates having desirable physical properties, such as tensile strength, (c) may be crushed and used as abrasives in many cleaning systems since they are generally quite insoluble in most typical solvents, and in other like utilities which will be readily apparent.

SUMMARY OF THE INVENTION

It has now been discovered that the above chlorine-containing homopolymers, and the fluorine and bromine analogs thereof, and fluorine, chlorine and/or bromine-containing copolymers are prepared in the novel polymerization reaction comprising reacting by contacting a. a monomer or mixture of monomers having the formula $R\text{-}(CX_3)_n$, (I), wherein $n$ is an integer from 2 to 4 and is preferably 2, X is fluoro, chloro or bromo, and R is an $n$-valent hydrocarbon or halo-substituted hydrocarbon group, each $-CX_3$ group being an allylic or benzylic trihalomethyl group; with b. CuX or $CuX_2$, wherein X has the above meaning; and c. phosphorous acid, an alkyl hydrogen phosphonate and/or a dialkyl hydrogen phosphonate.

By copolymer, we mean the polymer formed when two or more monomers are coreacted in the reaction. Hence, terpolymers, tetrapolymers, etc., are included in the term copolymer.

By allylic or benzylic trihalomethyl group is meant a trihalomethyl group which is directly attached to an unsaturated aliphatic or aromatic carbon.

The copolymers are similar to the above described homopolymers in that they are heat-resistant and fire-resistant. They may be used interchangeably with the homopolymers in many instances.

The polymers produced according to the subject process are obtained in high yields and purity and have a high average molecular weight and a narrow molecular weight distribution. Thus, the previous necessity of extracting the product mixture to remove lower molecular weight fractions from the more useful higher molecular weight fractions is reduced and may be eliminated. The elimination of such a purification step is an important commercial advantage for economic and other obvious reasons, such as product control.

The cuprous and/or cupric halides are necessary in the subject reaction in only catalytic amounts, but may suitably be present in amounts up to about 5 weight percent, or more, based on the total weight of the monomer(s). Preferably the copper halide is present in amounts between about 0.01 and about 2 weight percent, same basis. The cuprous halides are preferred over the cupric halides in the reaction, and, since the possibility of halide interchange between the copper halide catalyst and reactant(s) and/or product exists, the X in the catalyst is preferably identical to the X in the reactant(s).

The reaction also requires at least trace amounts of phosphorous acid and/or an alkyl hydrogen phosphonate and/or a dialkyl hydrogen phosphonate. Oligomers are formed when less than about 1 mole of phosphorous acid and/or the phosphonates are present per monomer equivalent, based on the number of $-CX_3$ groups. Higher molecular weight polymers are formed, however, when phosphorous acid and/or the phosphonate are present in excess of 1 mole per monomer equivalent. An excess of phosphorous acid and/or the phosphonates is therefore generally preferred, such as a three- to five-fold excess.

Suitable alkyl or dialkyl hydrogen phosphonates in the subject reaction may be any one or any mixture of the known class of alkyl or dialkyl hydrogen phosphonates. Examples of suitable such phosphonates include methyl, dimethyl, ethyl, diethyl, n-butyl, di-n-butyl, octyl, dioctyl hydrogen phosphonate and other like phosphonates. The preferred phosphonates are those wherein the alkyl group has from one to four carbon atoms.

The subject reaction is advantageously conducted in solution. Suitable reaction solvents include the chlorinated hydrocarbon solvents, such as $CCl_4$, or aliphatic ethers, such as dioxane, tetrahydrofuran, and diethyl ether, and the like. Also, an excess of the liquid alkyl or dialkyl hydrogen phosphonates or phosphorous acid can be used advantageously as the reaction solvent.

The presence of oxygen or water in the reaction may be detrimental. Accordingly, a substantially anhydrous, inert atmosphere is preferred.

The reaction temperature and pressure may be varied to convenience so long as the reaction mixture remains in substantially liquid form. Typically, a reaction temperature from about 0° to about 200° C. is suitable, and a temperature from about 25° to about 125° C. is preferred. At temperatures below about 0° C., the reaction rate is too low to be practical, and at temperatures above 200° C., high pressures are required.

The reaction time varies inversely with the temperature, the concentration of copper salt and the concentration of phosphonate or phosphorous acid in the reaction. Typical times vary from a few minutes to a few hours, e.g. 48 to 96 hours, but generally are about 6 to about 12 hours at the preferred temperatures and concentrations.

Suitable monomers in the subject process are represented by Formula I above. Typically R in I is a hydrocarbon or halo-substituted hydrocarbon group having from two to about 35 carbon atoms, and is limited only in that each reactive $-CX_3$ group must be an allylic or benzylic trihalomethyl group. Examples of suitable such monomers include those of Formula I wherein

TABLE I

| X  | n | R              |
|----|---|----------------|
| F  | 2 | 1,4-$C_6H_4$   |
| Cl | 2 | 1,4-$C_6H_4$   |
| Cl | 2 | 1,4-$C_6Cl_4$  |

| | | |
|---|---|---|
| Cl | 2 | 1,4-C₆Cl₂H₂ |
| Br | 2 | 1,4-C₆H₄ |
| F | 2 | C₂H₂ |
| F | 2 | C₂F₂ |
| Cl | 2 | C₂H₂ |
| Cl | 2 | C₂Cl₂ |
| Cl | 2 | C₂Br₂ |
| Br | 2 | C₂Br₂ |
| Cl | 2 | 4,4'-biphenylene |
| Br | 2 | 4,4'-biphenylene |
| Cl | 2 | oxybi-p-phenylene |
| F | 2 | 3,3'-biphenylene |
| Cl | 2 | 4,4'-perchlorobiphenylene |
| F | 2 | 3,3'-tetrafluorobiphenylene |
| Cl | 2 | 1,4-butadienylene |
| Br | 2 | 1,6-hexadienylene |
| F | 2 | 1,10-decadienylene |
| Cl | 2 | 1,18-octadienylene |
| Cl | 2 | 1,4-naphthylene |

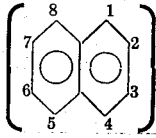

| | | |
|---|---|---|
| Br | 2 | 2,5-naphthylene |
| F | 3 | 1,3,5-C₆H₃ |
| Cl | 4 | 1,4,5,8-naphthylene |
| Cl | 2 | p-tri or tetraphenylene |
| Cl | 2 | 1,4-C(Cl) = C(Cl)-C₆Cl₄-C(Cl)=CCl- |
| Cl | 2 | -CH = C(C₆H₅)- |
| Br | 2 | 2,5-dimethyl-1,4-phenylene | and other like compounds. Preferred monomers are those defined by I above wherein n is 2 and R is a group of six to about 16 carbon atoms. Preferred monomers therefore include 1,4-bis(trichloromethyl) benzene,
1,3-bis(trichloromethyl) benzene,
perchloro-p-xylene,
4,4'-bis(trichloromethyl) diphenyl,
perchloro-p-bitolyl,
perchloro-1,4-bis(propenyl) benzene, and
perchloro-4,4'-bis (propenyl) diphenyl.

The physical properties of the copolymers vary in accordance with the monomers that are coreacted in the subject reaction; e.g., the copolymer of perchloro-p-xylene and perchloro-p-bitolyl will be more fire-resistant than the corresponding copolymer of $\alpha,\alpha,\alpha,\alpha',\alpha',\alpha'$-hexachloro-p-xylene and $\alpha,\alpha,\alpha,\alpha',\alpha',\alpha'$-hexachloro-p-bitolyl, and the copolymers from a mixture of meta and para-xylene monomers will be more soluble and have a lower softening point than the copolymer from the corresponding mixture of para-isomers, etc. The physical properties of the copolymers can also be altered (or determined) by the ratio of monomers in the reaction mixture and subsequently in the reaction product. Substantially any ratio of monomers is suitable.

SPECIFIC EMBODIMENTS

The following examples further illustrate the invention.

EXAMPLE 1

Poly(Perchloro-p-Xylene)

Perchloro-p-xylene (20.0 g., 0.0444 mole) and anhydrous cuprous chloride (4.43 g., 0.0444 mole) were sequentially charged into a vessel equipped with a stirrer, dropping funnel, and a condenser. The system was continuously purged with dry nitrogen, and dibutyl hydrogen phosphonate (87.0 g., 0.44 mole) was rapidly added. The temperature exothermed up to about 60° C. The reaction was quenched after 24 hours by adding 400 ml. of water. The mixture was stirred for another 16 hours in air and the precipitated polymer (14.6 g.) was filtered out, washed with water and air dried. The polymer was white, substantially insoluble in most solvents, e.g., CHCl₃, CCl₄, benzene, orthodichlorobenzene, hot H₂SO₄, and hot NaOH; and, the structure was confirmed by infrared (IR) as being substantially the same as the homopolymer prepared by Ballester et al.

In another experiment, a similar amount of perchloro-p-xylene was maintained in contact with a similar amount of di-n-butyl hydrogen phosphonate for about 16 hours at room temperature, under dry nitrogen, and in a stoppered flask. No reaction was observed. However, upon the addition of 4 g. of CuCl a noticeable reaction occurred in about 2 minutes.

EXAMPLE 2

Poly(Perchloro-p-Xylene) Prepared in Dioxane

Anhydrous cuprous chloride (2.0 g., 0.02 mole) and diethyl hydrogen phosphonate (60.7 g., 0.44 mole) were charged to a vessel as described in Example 1. The system was continuously swept with dry nitrogen, and perchloro-p-xylene (20.0 g., 0.0444 mole) in 100 ml. of dioxane was added dropwise with stirring. The mixture was stirred for 16 hours, quenched with 200 ml. of water, and stirred in air for 72 hours. The precipitated polymer (14.5 g.) was recovered as in Example 1 and had substantially the same physical properties as the product of Example 1. The product was extracted with chloroform and 10.4 g. of chloroform-insoluble product was recovered.

EXAMPLE 3

Poly(Perchloro-p-Bitolyl)

Anhydrous cuprous chloride (0.1 g., 0.001 mole) and perchloro-p-bitolyl (10.0 g., 0.015 mole) dissolved in 200 ml. of tetrahydrofuran were charged into a vessel as described in Example 1. The system was continuously swept with dry nitrogen as diethyl hydrogen phosphonate (7.2 g., 0.052 mole) was added dropwise with stirring. The reaction mixture was stirred for 16 hours, quenched with 200 ml. of water, and stirred for 6 hours. The precipitated polymer (8.4 g.) was recovered as in Example 1. The polymer structure was confirmed by IR as being substantially the same as the homopolymer prepared by Ballester et al.

Similar results were obtained when the reaction was conducted in dioxane.

The above homopolymer was dissolved in trichloroethylene and applied to glass cloth. After the solvent was evaporated, four layers of the impregnated cloth were pressed at 10,000 psi and 400° C. for 1 hour. The polymer in the resulting laminate was insoluble in trichloroethylene and exhibited fire-resistant properties and had a high tensile strength.

EXAMPLE 4

Perchloro-p-Xylene and Perchloro-p-Bitolyl Copolymer

Using substantially the same equipment and procedure set forth in Example 2, a solution of perchloro-p-xylene (5.8 g., 0.0128 mole) and perchloro-p-bitolyl (8.2 g., 0.0128 mole) in 250 ml. of dioxane was reacted in the presence of diethyl hydrogen phosphonate (7.2 g., 0.0520 mole) and anhydrous cuprous chloride (0.1 g., 0.001 mole). The copolymer (11.7 g.) was recovered as in Example 1. Ether extraction of the white polymer gave 2 g. of dissolved material. The remaining 9.7 g. was soluble in CCl₄. The copolymers softened at 320° C. and turned darker at higher temperatures, but did not decompose even at 480° C.

EXAMPLE 5

Perchloro-p-Xylene and Perchloro-1,4-bis-(Propenyl) Benzene

Using substantially the same equipment and procedure set forth in Example 2, a solution of perchloro-p-xylene (10.0 g., 0.022 mole) and perchloro-1,4-bis-(propenyl) benzene (14.2 g., 0.022 mole) in 300 ml. of dioxane was reacted in the presence of di-n-butyl hydrogen phosphonate (21.2 g., 0.097 mole) and anhydrous cuprous chloride (0.5 g., 0.005 mole). The dark brown polymer (21.1 g.) was extracted with 400 ml. of ether and then with 400 g. of methylene chloride; 4.4 g. of black polymer was recovered from the ether solution and 3.5 g. of polymer was recovered from the methylene chloride solution. The remaining 13.2 g. was dark brown and insoluble in $CCl_4$ and dioxane but was reasonably soluble in tetrahydrofuran. The latter product was thermally stable at 495° C.

The copolymers produced in Examples 4 and 5 can be cast as heat-resistant and fire-resistant films having desirable physical properties, such as tensile strength.

I claim:

1. A method of preparing fluorine-, chlorine- and/or bromine-containing polymers comprising reacting by contacting in liquid phase and at a temperature of between about 0° C. and about 200° C.
   a. at least one monomer having the formula $R\text{-}(CX_3)_n$, wherein $n$ is an integer of from 2 to 4, X is fluoro, chloro or bromo, and R is an $n$-valent hydrocarbon or halohydrocarbon group, each $-CX_3$ group being an allylic or benzylic trihalomethyl group; with
   b. a catalytic amount of CuX or $CuX_2$, wherein X has the above meaning; and
   c. at least one of the group consisting of phosphorous acid, an alkyl hydrogen phosphonate and a dialkyl hydrogen phosphonate wherein at least 1 mole of (c) is present per monomer equivalent.

2. The process defined in claim 1 wherein (b) is present in an amount up to about 5 weight percent, based on the total weight of (a).

3. The process defined in claim 2 wherein (b) is present in an amount between about 0.01 and about 2 weight percent.

4. The process defined in claim 1 wherein X is chloro.

5. The process defined in claim 2 wherein R is a group having from two to 35 carbon atoms.

6. The process defined in claim 5 wherein R is a group having from six to 16 carbon atoms.

7. The process defined in claim 1 wherein R is an $n$-valent aromatic hydrocarbon or halo-substituted aromatic hydrocarbon group.

8. The process defined in claim 6 wherein (a) is at least one of 1,4- or 1,3-bis(trichloromethyl) benzene, perchloro-p-xylene, 4,4'-bis(trichloromethyl) diphenyl, perchloro-p-bitolyl, perchloro-1,4-bis(propenyl) benzene or perchloro-4,4'-bis(propenyl) diphenyl, and wherein (b) is CuCl or $CuCl_2$.

9. The process defined in claim 8 wherein said temperature is between about 25° C. and about 125° C.

* * * * *